United States Patent
Aaronson et al.

(10) Patent No.: US 6,363,062 B1
(45) Date of Patent: Mar. 26, 2002

(54) COMMUNICATIONS PROTOCOL FOR PACKET DATA PARTICULARLY IN MESH TOPOLOGY WIRELESS NETWORKS

(75) Inventors: Itai Aaronson, Burlingame; Patrick A. Worfolk, Cupertino, both of CA (US)

(73) Assignee: Caly Corporation, Sunnyvale, CA (US)

( * ) Notice: Subject to any disclaimer, the term of this patent is extended or adjusted under 35 U.S.C. 154(b) by 0 days.

(21) Appl. No.: 09/328,105

(22) Filed: Jun. 8, 1999

(51) Int. Cl.$^7$ ............................................. H04B 7/212
(52) U.S. Cl. ...................... 370/348; 370/443; 370/459
(58) Field of Search ................................ 370/346, 347, 370/348, 442, 443, 444, 458, 459, 406, 407, 408, 449, 450, 328, 338, 448, 455; 340/825.5

(56) References Cited

U.S. PATENT DOCUMENTS

| | | | |
|---|---|---|---|
| 5,231,634 A | * 7/1993 | Giles et al. | 370/347 |
| 5,621,732 A | * 4/1997 | Osawa | 370/348 |
| 5,648,969 A | 7/1997 | Pasternak et al. | 370/349 |
| 5,710,756 A | 1/1998 | Pasternak et al. | 370/216 |
| 5,721,735 A | * 2/1998 | Smiroldo | 370/442 |
| 5,768,324 A | * 6/1998 | Han | 370/347 |
| 5,774,468 A | * 6/1998 | Maruyama et al. | 370/347 |
| 5,805,595 A | * 9/1998 | Sharper et al. | 370/442 |
| 5,828,663 A | * 10/1998 | Ikegami | 370/347 |
| 5,844,900 A | * 12/1998 | Hong et al. | 370/347 |
| 5,844,905 A | * 12/1998 | McKay et al. | 370/443 |
| 5,889,772 A | * 3/1999 | Fischer et al. | 370/346 |
| 5,903,566 A | 5/1999 | Flammer, III | 370/406 |
| 5,936,949 A | 8/1999 | Pasternak et al. | 370/328 |
| 6,018,659 A | 1/2000 | Ayyagari et al. | 455/431 |

FOREIGN PATENT DOCUMENTS

WO    WO 99/21313    4/1999

* cited by examiner

*Primary Examiner*—Melvin Marcelo
*Assistant Examiner*—Phuongchau Ba Nguyen
(74) *Attorney, Agent, or Firm*—Thomas Schneck

(57) ABSTRACT

In a wireless mesh topology data communications network, a communications method having a type of handshaking protocol for data exchange. A portion of the protocol is synchronous, using a schedule of control channel sessions held at all mutually communicating nodes of the network and a portion of the protocol is asynchronous, relying upon gaps between control channel sessions for transmission of requested data. Nodes which are in line of sight relation request data from each other using a request to send message and a clear to send message. A requesting node sends an RTS message to a neighbor node with information about gaps specifying the location of requested data. A supplying node transmits a potential schedule for sending requested information and the requesting node sends a CTS message agreeing upon the schedule. The potential schedule includes a number of available gaps between known control channel sessions. Because transmissions are scheduled, rapidly switchable directional antennas at requesting and supplying nodes may be used with good advantage.

11 Claims, 4 Drawing Sheets

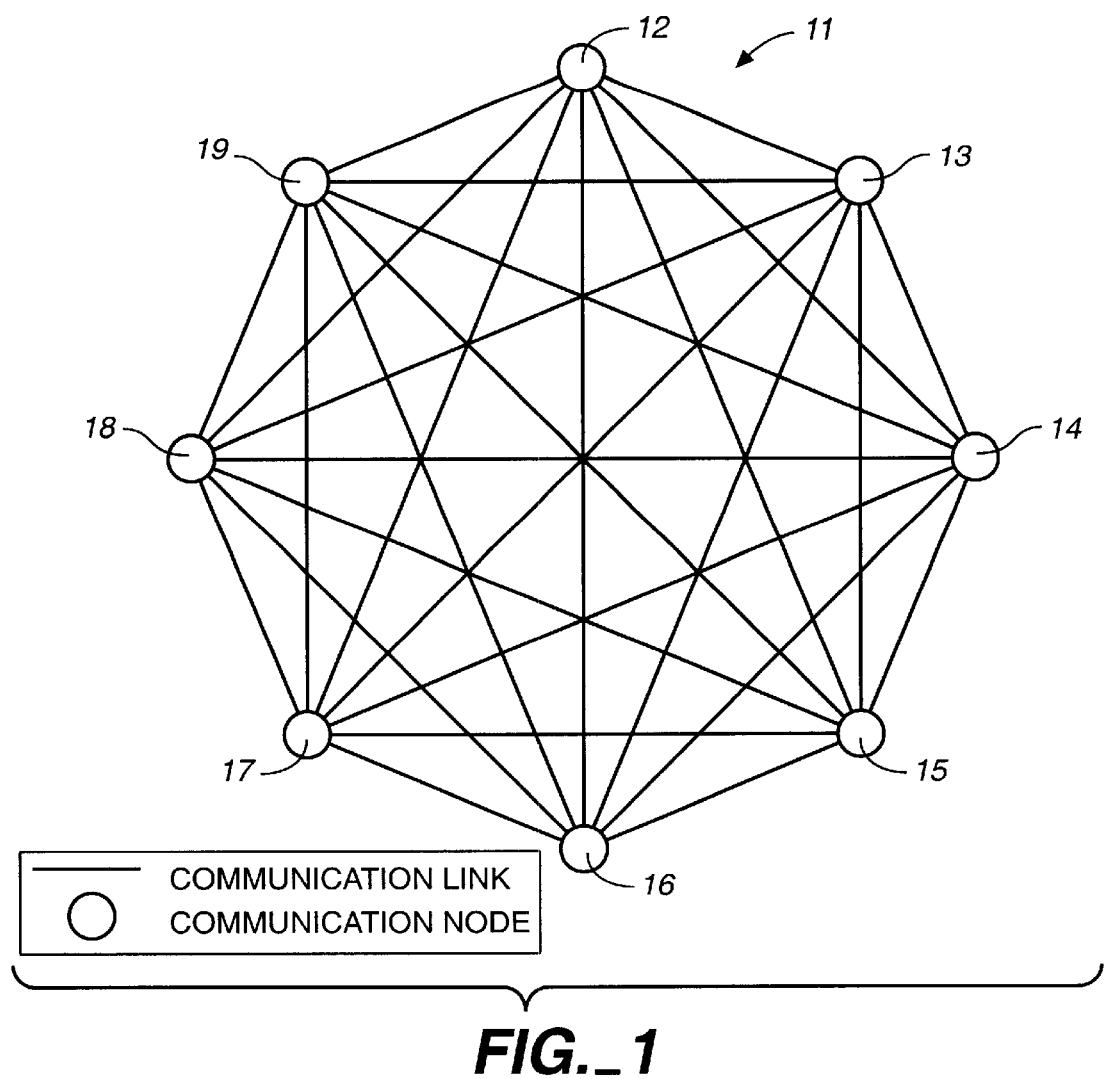
FIG._1
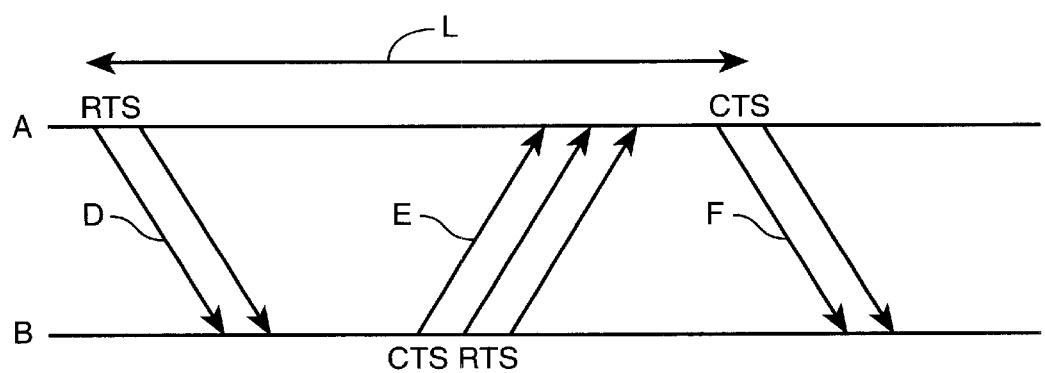
FIG._2

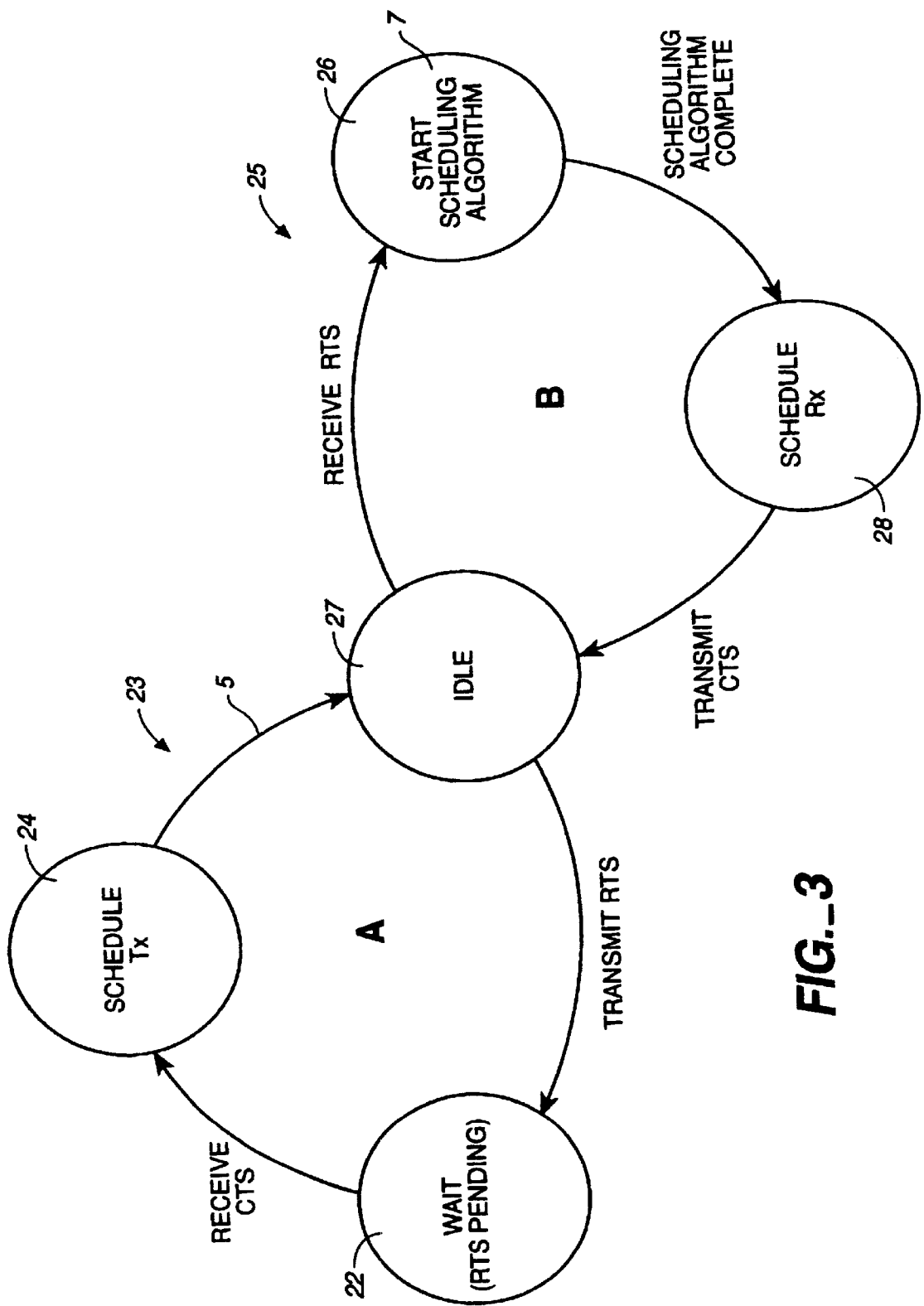
FIG._3

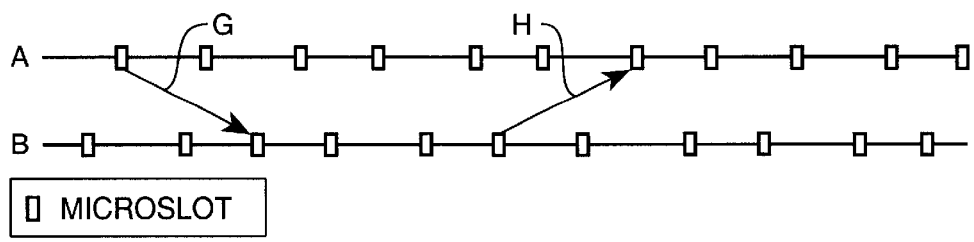
FIG._4A
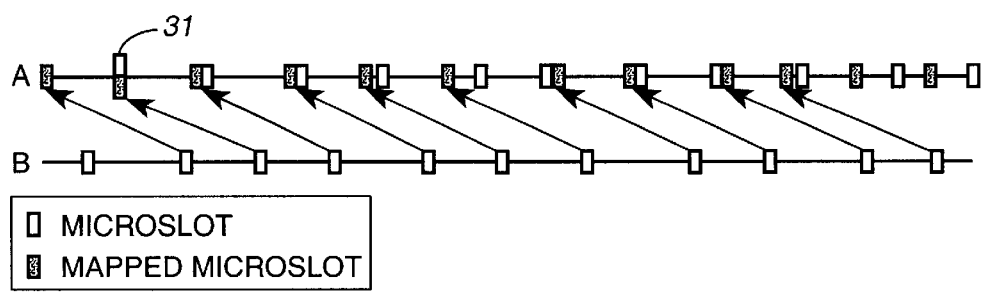
FIG._4B
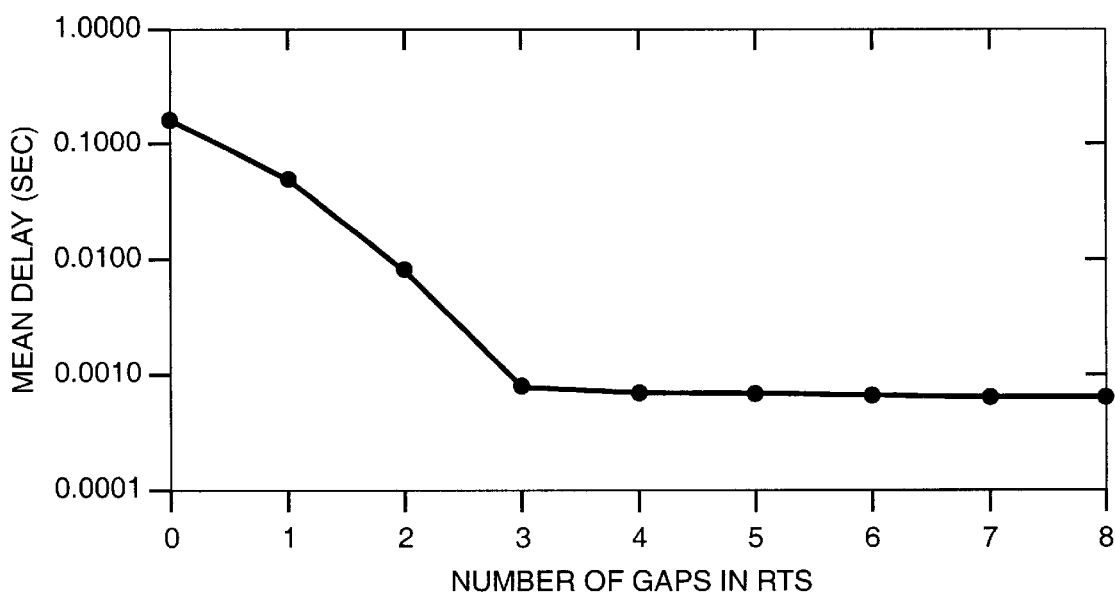
FIG._5

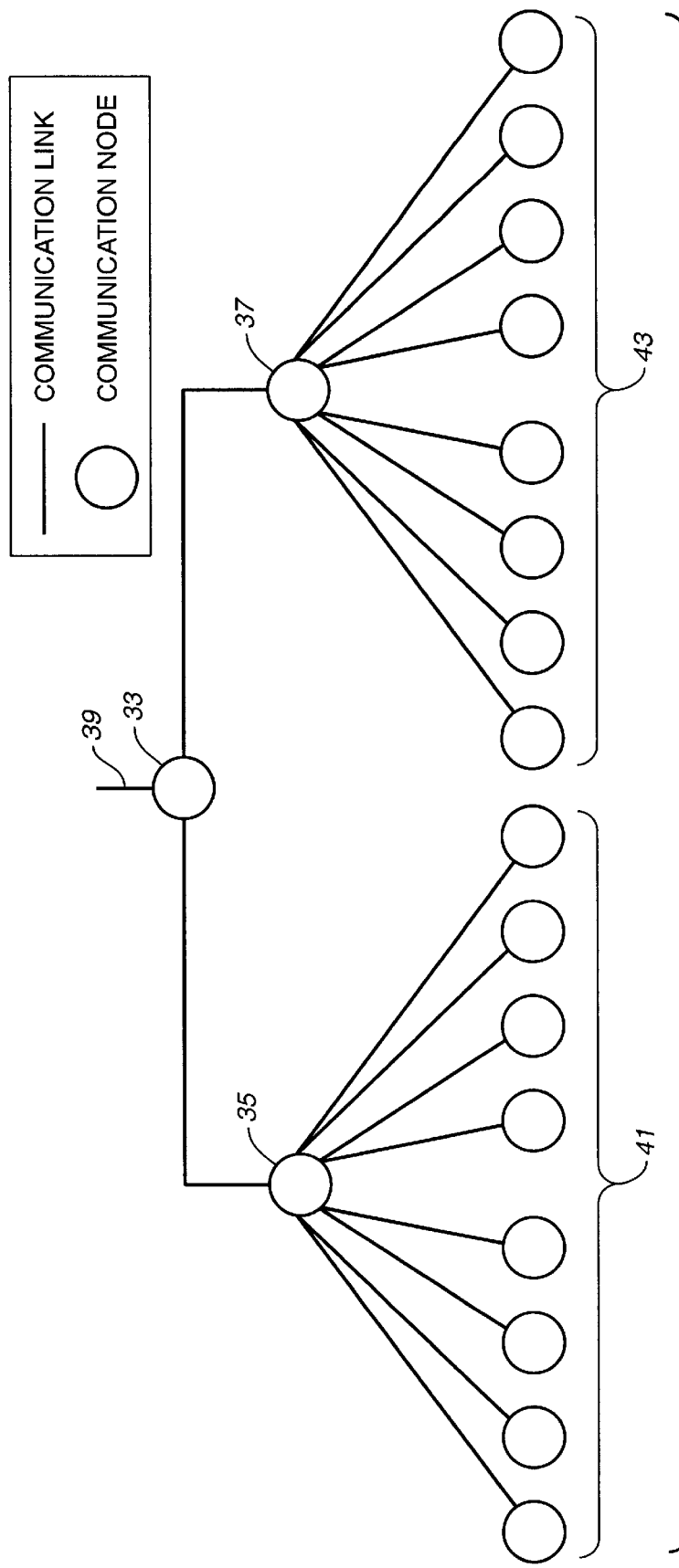
FIG._6

COMMUNICATIONS PROTOCOL FOR PACKET DATA PARTICULARLY IN MESH TOPOLOGY WIRELESS NETWORKS

TECHNICAL FIELD

The present invention relates to a wireless radio communications method and, in particular, to a packet data communication method between network nodes.

BACKGROUND ART

Broadband wireless networks operating at the multi gigahertz spectrum have the potential of delivering a multitude of services to customers at diverse locations. The high frequency of the spectrum allows the deployment of wireless networks with high capacity using a large amount of bandwidth per network per spatial region. In former times, the radio spectrum was licensed for individual services or uses, such as television bands, amateur radio bands, aviation bands, etc. Within each band, individual users were licensed on a link basis such that all users within a band were licensed. In 1998, the FCC (Federal Communication Commission) departed from this approach and auctioned a large amount of the radio spectrum in the 27 GHz and 31 GHz bands for use in Local Multipoint Distribution Systems (LMDS). Similar spectral bands were opened for use in Canada, Australia, New Zealand and Argentina. In Europe, the radio spectrum between 24.5 and 26.5 GHz was also assigned for multipoint use. Many countries are in the process of opening different bands at the high frequency spectrum between 10 GHz and 40 GHz for use on a territorial basis rather than on a link per link basis. This main difference of approach in licensing the radio spectrum (territorial versus link) enables the network operator to build a network which covers large topographical area and offers connectivity services to those customers in line of sight relation in the region. This is because millimeter wave transmission depends on line of sight between communicating transmitters and receivers.

The new regulatory arrangement after 1988 led to the development of point to multipoint wireless systems. Those systems are based on series of base stations with sectoral transmitters and receivers covering cells split into sectors which include customers whose transceivers are facing towards the base station's sectoral antenna. Those customers receive the information broadcast downstream from the base station and select the information addressed to them. On the upstream side, in the TDMA (time division multiple access) mode, the base station assigns time slots or, in the FDMA (frequency division multiple access) mode, frequency slots to each one of the remote customers' transceivers to allow polling information based on the amount of information needed to be transmitted by those customers.

The data protocols for communication are known as "layers" because each layer is a level of the communications system, having its own rules and sometimes having people whose only concern is with operation of that level. The concept of "layers" is explained in many data communication texts and may be summarized as follows. Starting with hardware, considered as the lowest layer, the equipment for making radio communication possible, is known as the "physical layer", while the highest level, which is the application run by the consumer, is known as the "application layer". Immediately above the physical layer is the "link layer" which manages the transmission of data without error. Then follows the "network layer" which performs a routing function to set up connections across a network. Then follows the "transport layer" which provides addresses to the network layer and determines the size of units in which data are transported. Next follows the "session layer" which arranges commands between terminals, such as "start" and "finish". Just below the application layer and above the session layers is the "presentation layer" which defines the format of the data presented, overcoming differences in the requirements of different terminals. In wireless networks, there is an additional layer, the "medium access control layer", or MAC layer, which is used within the network topology as a protocol for data communication between transceivers of interconnected nodes on the network. In the hierarchy of layers described above, the MAC layer would be between the physical layer and the link layer, acting as an interface between the two. In the past, the medium access control (MAC) layer for point to multipoint (PMP) cellular systems was relatively simple and has been in use for many wireless systems, both on the ground, in cellular mobile systems and broadband systems, as well as satellite to ground (VSAT) systems.

The advantage of a point to multipoint (PMP) network with a MAC layer is its simplicity. The main disadvantage of PMP system arises because of the broadcast nature of the downstream link and the polling of the upstream link. When the base station transmits in a certain frequency and time slot (TDMA), all the customers in the sector except the one that receives information are blocked from receiving any information. In the upstream direction, only one customer can transmit at a certain time on a certain frequency. Thus, when the number of customers in a sector increases, the average data rate available per customer decreases.

The second deficiency of the PMP system is the need to establish expensive base stations at a high positions with a good line of sight to all customers. This demands up-front investment.

The third disadvantage comes from the cellular nature of the PMP MAC layer. The nodes can only communicate with their base station sectoral transceiver, and thus no repeating or route diversity can take place. If a line of sight does not exist from a base station to subscriber units, a new base station should be constructed so that all customers can be connected.

In U.S. Pat. No. 5,903,566 to G. Flammer, a multi-node mesh topology wireless network is disclosed for transmitting large data files, block by block. The transmission protocol involves checking the validity of requested blocks of code. For invalid blocks, the source node frees its packet transmit buffer and the process ends. For a valid block, the source node send the block to the destination node then frees its packet transmit buffer and the process ends. The communications protocol for transfer of blocks is not specified.

SUMMARY OF THE INVENTION

In cable applications, mesh topology networks are avoided because for "n" nodes, n(n−1)/2 circuits are required to connect all nodes. However, mesh topology networks are ideal for broadband wireless applications especially when packet data are used for data transmissions, such as in IP (Internet protocol) networks. The current invention relates to a new type of space and time switched MAC layer protocol designed to enable efficient data transmission particularly in mesh topology networks, or other type of network topology on a packet basis.

The advantages of a mesh network are as follows: (1) The network allows repeating information between the nodes thus enables reliable connections between customers and a backbone access point (BAP) via other nodes in the area with whom line of site (LOS) communication can be established, thus achieving high coverage of the relevant area. (2) The network is built around the customers. The network bandwidth capacity increases as the number of nodes (customers) joining the network increases, due to the creation of multiple parallel paths for the data flow. (3) Route diversity and load balancing is enabled by the availability of multiple routes from nodes to other nodes.

The difficulty of implementing this system is the need to have an algorithm to control and synchronize the data transmission between the nodes based on their relative location with an available line of sight distance and an available link, as well as possible interference from burst data traffic originating and terminating at other nodes. In the IP type of network, data packets are randomly generated with random origination and destination cells. Thus, optimal traffic coordination should be adjusted on a packet by packet basis. In addition, in contrast to physically connected networks of fiber or copper, a wireless mesh may have a transceiver and directional antenna with multiple beams and the ability to switch between them. Thus, a space and time switched MAC algorithm should take into account the propagation delay between the different nodes, the queuing of data with the different addresses at each node, the synchronization of the time of transmitting from multiple nodes and the time of reception at multiple different nodes at different delays based on the location of the destination nodes.

This invention features an adaptive space and time switched (STS) MAC protocol design to efficiently allow the implementation of mesh networks with IP type of packet data flow between the network nodes in peer-to-peer communication as well as node-to-BAP and BAP-to-node. The network can operate with TDD (time division duplex wireless radios) operating on the same frequency or at multiple frequencies at different links simultaneously. The STS MAC protocol assigns capacity based on traffic load.

The basic principle of the STS MAC protocol of the present invention is the use of synchronous schedule information as a control channel between the nodes to assign asynchronous variable length packet data slots in between the schedule information time slots. The available data slots are adaptively assigned by each recipient node to the data initiator node based on requested time slots by the initiator and the available time slots of the recipient.

The adaptive STS MAC protocol of the present invention is designed to efficiently support high-bandwidth communication in networks with the following structure: (1) nodes with some wireless connectivity forming a partially (or fully) connected mesh. (2) One or more special nodes, known as backbone access points (BAPs), that connect the wireless mesh to the IP backbone. The nodes in the network have the following capabilities: (1) Each node is capable of steering its receiving and transmitting direction beam antenna to none or one or more of a fixed number of sectors. (2) Signals arriving on different sectors do not interfere with each other. (3) Communication is half-duplex, and a node may communicate on only one sector at a time.

The current adaptive STS MAC algorithm invention enables the creation of multiple simultaneous transmission links between subgroups and peers of nodes in the network based upon the momentary burst of packet traffic load initiated in multiple network nodes and having multiple variable destination addresses, thus allowing dramatic increases in the efficient use of the spectrum at a given spatially covered region, route diversity and load balancing for packet carried information.

BRIEF DESCRIPTION OF THE DRAWINGS

FIG. 1 is a diagram of a fully connected mesh topology network employing the present invention.

FIG. 2 is a signal session diagram between two nodes showing the data communications protocol of the present invention within a single control channel microslot.

FIG. 3 is a state machine diagram for logic of the control channel illustrated in FIG. 2.

FIGS. 4A and 4B are signal transmission diagrams between two nodes showing the relation of a plurality of microslots of the kind illustrated in FIG. 2, existing between two nodes.

FIG. 5 is a graph of mean delay time versus gaps.

FIG. 6 is a diagram of a tree structure network employing the present invention.

BEST MODE FOR CARRYING OUT THE INVENTION

With reference to FIG. 1, a wireless mesh topology network 11 is shown having fully mutually interconnected, line-of-sight nodes 12–19. In the present invention, all nodes need not be interconnected, so long as a node has line of sight communication with at least one neighbor, with the neighbor being in line of sight communication with the rest of the network on the same basis. Communication between nodes is by packets using the STS MAC protocol method of the present invention. The basic features of the protocol are as follows. Time is broken up into frames of known length. In each frame, every node has scheduled slots with which to exchange control information with each of its neighbors, the control channel. Any time a node is not participating in a control channel transmission or reception, it is free to schedule the transmission or reception of data packets. As part of the control channel, requests are made to transmit bits. As part of the request, information about unscheduled periods, i.e. available time or gaps, in the requesting node's data channel is transmitted. The node receiving the requests to transmit (RTS) grants or denies transmissions. Part of the grant includes a schedule, selected from the requester's schedule, for when to transmit the data.

STS MAC Layer Overview

The MAC layer is the interface between the link layer that generates and consumes the payload data units (PDUs) and the physical layer that is responsible for the actual transmission. The general principle of the MAC protocol is that each pair of neighbors must communicate control information on a regular basis in order to schedule data transmissions. Thus, we have the concept of a frame. During every frame, a node communicates with each of its neighbors making requests to send (RTS) and making grants of clear to send (CTS). The time spent transmitting and receiving this control information is called the control channel. Data transmissions are interwoven throughout the frame, avoiding the control channel. The performance of the MAC scheduling depends on the following factors: (1) The length of the frame. (2) The percent of the frame taken up by the control channel. (3) The efficiency of scheduling data around the control channel. (4) The efficiency of scheduling data transmissions between neighboring nodes.

The Control Channel

Within each frame, each node must communicate with each of its neighbors. The basic idea is that a request for transmission is made, accompanied with some information about when a transmission can be made. The potential receiver must then grant all or part or none of the request. With each neighbor, the basic communications that need to occur are:

An RTS message to the neighbor with information about free time in the node's schedule.

A CTS message from the neighbor granting transmission at some mutually agreeable time.

An RTS message from the neighbor with information about the neighbor's unscheduled time.

A CTS message to the neighbor granting transmission at some mutually agreeable time. The above exchange is called a session and is shown in FIG. 2.

With reference to FIG. 2, the length of the session is indicated by the arrow, L, and is the same for both nodes A and B, indicated by horizontal lines, but it is offset by the propagation delay, indicated by the diagonal arrows D, E, and F. The A node, which is seen to transmit the first RTS to the B node, indicated by the D arrow, is the initiator and carries the schedule of the A node for time available for data. This is followed by a CTS transmission from the B node to the A node with an agreed time. The B node then transmits to the A node an RTS transmission with a schedule of available time for data. Arrow F indicates an acknowledgment by the A node with an agreed time for the transmission of requested data.

In FIG. 3, the basic state machine for the control channel logic is seen to have two loops 23 and 25 about idle state 27. From an idle state, it will be seen that the A node transmits an RTS message to the B node, indicated by wait state 22 where the RTS schedule is read for acknowledgment with an agreed transmission time sent by node B with a CTS message to node A. A transmission is then scheduled by node A as indicated by state 24. Node B also lists available unscheduled gaps with a request to node A, indicated by state 26 wherein node A starts a scheduling algorithm, develops a schedule, indicated by state 28 and transmits a CTS message to node B. This sequence is carried out among all neighbors. The length of the session between node A and node B is the sum of the following:

1. The propagation delay of the RTS message from the initiator A node to the recipient neighbor B node.
2. The transmission delay for the entire RTS packet to arrive.
3. The processing time it takes the neighbor to schedule the RTS.
4. The propagation delay of the CTS message from the neighbor B node back to the initiator A node.
5. The transmission delay for the entire CTS message to arrive.
6. The transmission delay for the entire RTS message to arrive.
7. The processing time it takes the initiator to schedule the neighbor B node's RTS.
8. The transmission delay of transmitting the entire CTS packet. Assuming that the RTS and CTS messages have the same length, the length of the session is:

4 control packet (message) lengths+2 propagation delays+2 processing times.

Every node must have at least one session with each of its neighbors every frame and none of the sessions can be overlapping. The sessions occur on a fixed schedule. This schedule is determined for the entire network by a global scheduling algorithm. In this algorithm, the following assumptions are made: the topology of the network is known. The propagation delays between neighbors are known. The control packet transmission delays are known. The processing time is constant. A schedule for the sessions of each node in the network is computed and distributed to each node. When the topology of the node changes, for example due to admission or departure of nodes, a new session schedule will need to be computed, propagated to all nodes in the mesh, and implemented at a specified future time.

Every node knows, in addition to its own control channel schedule, its neighbor's control channel schedule. This is true for all neighbors for which there is line of sight communication. It may also know the control channel schedule for other base stations where there can be no communication, but these control channel microslots may be disregarded. During a data transmission to a neighbor, the node must break transmissions in order to maintain its own control channel transmissions and receptions. Similarly, it must break transmission to allow its neighbor to maintain its control channels. The broadcasting node must take into account propagation delays when pausing for a neighbor's control channel. The small time slots used for the control channel are called microslots. It is not required that a node's and its neighbor's RTS and CTS exchanges be back to back, however this is an efficient way to schedule the control channel.

In FIG. 4A, the horizontal lines A and B indicate two neighbor nodes in a mesh topology network. With reference to FIG. 4A, the control channels or microslots for a node are shown. The timing of the channels is known and broadcast to other nodes. When transmitting to node B, the A node is particularly interested in the microslots of the B node, shown below the microslots of the A node, but on the same time schedule. The downwardly descending arrow, G, indicates the propagation lag of the node B receiver compared to the node A transmitter on RTS. Similarly, the ascending arrow, H, indicates the propagation lag of the node A receiver compared to the node B transmitter on RTS.

In FIG. 4B, the microslots of node B have been mapped to node A, taking into account propagation delay, since node A must know the microslot schedule of the neighboring node. The dark rectangles on the A node line are the B node control channels. Note that gaps exist between the combined microslots in the A node line. These gaps are available for use by the data channel for transmission from A to B.

Now consider protocols for making a request to send, RTS, to a neighbor. Each node has an opportunity to make an RTS call to a specific neighbor once per frame. The first step is to determine how many bits are queued to be sent to this neighbor that have not yet been scheduled. The full number of bits are requested optionally, the request may be limited to a smaller number of bits. A node tracks the times which it has already scheduled to receive or send data. Between these times, there are gaps, and there is an end of schedule time. The node knows the earliest possible time it will receive a CTS from a neighbor. It then selects the first 3 gaps after this time and also the end of schedule time to package into the RTS. The start and stop time of the gaps relative to CTS is what is packaged into the RTS. More or fewer gaps could optionally be selected. Other criteria could be used for selecting gaps to broadcast. When an RTS signal is received (for more than 0 bits), then it is the receiving node's responsibility to make the schedule. The first step is to determine the intersection of the gaps and end of schedule information from the requesting node and gaps in the schedule of the receiving node. The first 3 gaps are kept and the rest discarded. As much of the transmission as possible is scheduled in these gaps, starting with the first gap. If there is extra room, then the last gaps(s) are either shortened or discarded. If the gaps are not long enough, the remaining bits are scheduled at the end of the schedule. This results in a scheduled transmission in at most 4 segments (each segment will be woven around the control channel, possibly resulting in further segmentation). Note that the number of bits that can be transmitted in a gap depends on the control channel schedules of the two nodes. The gaps must be identified in the RTS and CTS fields. In the packet format table below, the bits identified as gaps are for address or location information of gaps outside of the control channel where data is to be found within the same frame.

Control Channel Packet Format Example

|  | bits |
|---|---|
| RTS message (in a packet) | |
| Requested number of bits, in 512 bit increments (0–1024*512, or 0–3.9 msec at 128 Mbps) | 10 |
| Gap 1:[start, stop] offset from end of CTS arrival (0.–4.096 msec, with 1/8 microsec granularity) | 30 |
| Gap 2:[start, stop] offset from end of CTS arrival | 30 |
| Gap 3:[start, stop] offset from end of CTS arrival | 30 |
| End of schedule | 15 |
| TOTAL | 115 |
| CTS message (in a packet) | |
| Gap 1:[start, stop] offset from end of CTS arrival (0.–4.096 msec, with 1/8 microsec granularity) | 30 |
| Gap 2:[start, stop] offset from end of CTS arrival | 30 |
| Gap 3:[start, stop] offset from end of CTS arrival | 30 |
| Gap4:[start, stop] offset from end of CTS arrival | 30 |
| TOTAL | 120 |

The RTS and CTS packets can be sent even when zero bits are requested or scheduled. This allows for modem synchronization and regular monitoring of neighboring node status.

Session Scheduling

The control channel is scheduled so that each node has at least one session per frame with each of its neighbors and is participating in at most one session at any instance in time. Multiple sessions per frame may be used where it is necessary to identify a large number of gaps. The length of the frame determines the minimum frequency at which a node has the opportunity to request and grant transmissions. Thus, frame length impacts the responsiveness of the network and the delays in the network. Shorter frames result in quicker response and shorter delay, but at the cost of decreased data bandwidth. Scheduling in an optimally short frame is in general a complex problem. However, an optimal schedule for control channels is in general not required, nor is it necessarily desirable. A simple algorithm that performs scheduling is as follows:

1. List all sessions that need to be scheduled.
2. Select a session and schedule it as early as possible (either node may be the originator).
3. Repeat step 2 until all sessions are scheduled. The suitability of such a schedule will depend on the network and its desired performance. Shorter schedules can be produced through modifications to the above algorithm or through a variety of alternative algorithms.

EXAMPLE

Simulations of the following network have been performed: 8 node mesh, as shown in FIG. 1, fully connected nodes randomly placed in a circle with a diameter of 3 km, using a 128 Mbps bandwidth, with all packets having 1024 bits at full traffic load. Each node generates 64*1024 packets/second and each packet's destination is randomly uniformly selected from a node's neighbors with 1 microsecond long microslots and with 10 microseconds of scheduled processing time and a frame length of 378 microseconds (control channel is 7.4%). The minimum transmit time is 1 microsecond in which 4 gaps plus end of schedule are passed in the RTS; five gaps are returned in the CTS. This simulation assumes arbitrary accuracy on gap boundaries and with no limit on how far ahead the gaps are. Also, queue lengths are not limited.

FIG. 5 shows the effect of changing the number of gaps identified in an RTS signal compared with the delay as a function of information passed in the RTS signal at 70% load. By employing at least 3 gaps in the RTS, the mean delay is minimized. There is minimal gain in increasing the number of gaps, although this may be done for redundancy or other reasons. There is always one more gap provided in the CTS signal than in the RTS signal.

In the above discussions a fully connected mesh was illustrated, but this is not a requirement. The present invention is not restricted to fully connected meshes. FIG. 6 illustrates a subset of fully connected mesh, namely a tree structure. This is a hierarchical organization with a central node 33 communicating with branch nodes 35 and 37. Node 33 may communication with a backbone access point along link 39. The branch nodes communicate with sub-branch nodes 41 and 43, respectively, in the same manner as described above. It is emphasized that for purposes of the present invention, node arrangements similar to tree structures are defined as mesh topology networks.

What is claimed is:

1. In a wireless packet radio mesh topology communications system of the type having a plurality of interconnected nodes, a communications method between nodes comprising:

dividing time into synchronous frames of known length, within each frame, providing time slots in accordance with a prearranged schedule for each pair of neighboring nodes during which each node exchanges control information with a communicating node, thereby providing synchronous control channel time slots, between each pair of communicating nodes, using said exchanged control information at each communicating node for scheduling asynchronous transmission or reception of data in between the control channel time slots, thereby providing a data channel amidst the control channel, whereby each note has regularly scheduled times for sending and receiving control information, with gaps in the times remaining after exchanging the prearranged schedule of control information, the gaps available for use as a data channel by said scheduling.

2. In a wireless packet radio mesh topology communications system of the type having a plurality of interconnected nodes, a communications method between two nodes, including an initiator node and a recipient node, comprising:

dividing time into synchronous frames of known length, within each frame, providing time slots in accordance with a prearranged schedule for each pair of neighboring nodes during which each node exchanges control information in a pairwise manner, thereby providing a synchronous control channel, the control channel having a communications protocol, with the initiator submitting to the recipient a request to send (RTS) message and additional data informing the recipient about the initiator's unscheduled time slots in its schedule, and the recipient granting to the initiator a transmission schedule of a mutually agreeable time based upon initiator's submission of unscheduled time in a clear to send (CTS) message submitted to the initiator, and between each pair of communicating nodes, using said exchanged control information at each communicating node for scheduling asynchronous transmission or reception of data in between the control channel time slots, thereby providing a data channel amidst the control channel.

3. The method of claim 2 further defined by attaching to the recipient's CTS message submitted to the initiator a schedule of its unscheduled time in a request to send (RTS) message, and the initiator granting to the recipient a transmission schedule for an agreed upon time in the unscheduled time using a clear to send (CTS) message.

4. The method of claim 1 further comprising each node preannouncing available time for transmitting data packets.

5. The method of claim 1 further comprising each node preassigning times for receiving data packets from neighbor nodes.

6. The method of claim 1 further defined by cyclically repeating the control channel in each frame.

7. A method or data packet communication for a mesh topology network of the kind having a plurality of nodes with half duplex wireless communication between nodes comprising:

communicating from each node a schedule of control channel microslots amidst the data channel, whereby each node has a schedule of microslots of all nodes with which it communicates, in a first node, reading control channel data in each microslot looking for a request to send (RTS) message containing a schedule of available gaps indicating requests by a requesting node, in a second node, in radio line of sight relation to the first node, reading the RTS message of the first node and replying with a clear to send (CTS) message containing a schedule of available gaps agreeing upon a schedule for receiving the requests of the first node and also sending to the first node an RTS message with a schedule of available gaps for supplying the requested data, and in the first node, replying to the RTS message of the second node with a CTS message agreeing upon a schedule of available gaps for receiving the requested data.

8. The method of claim 7 further comprising:

in a third node, reading control channel data in each microslot looking for a request to send (RTS) message containing a schedule of available gaps between microslots indicating data being requested by a requesting node, in a second node, in radio line of sight relation to the third node, reading the RTS message of the third node and replying with a clear to send (CTS) message containing a schedule of available gaps between microslots agreeing upon a schedule for receiving the request of requested data and also sending to the third node an RTS message with a schedule of available gaps for supplying the requested data, and in the third node, replying to the RTS message of the second node with a CTS message agreeing upon a schedule of available gaps for receiving the requested data.

9. The method of claim 7 wherein the number of gaps in the RTS message is at least two.

10. The method of claim 7 wherein a fresh schedule of control channel microslots is communicated from each node upon admission or departure of a mutually communicating node.

11. The method of claim 7 wherein a gap is ignored if the duration of the gap is less than a minimum specified duration.

* * * * *